Aug. 20, 1935.     J. G. ZOLLEIS     2,012,091
VALVE
Filed May 24, 1933     2 Sheets-Sheet 1
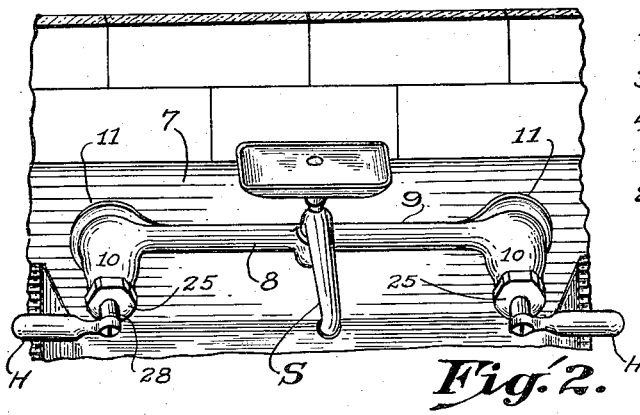
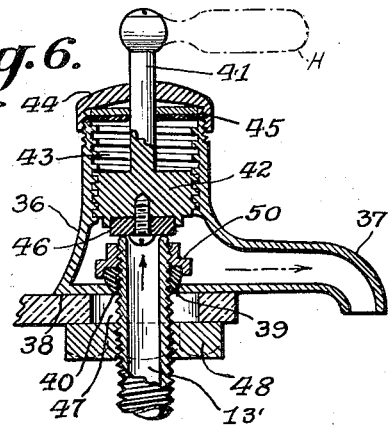
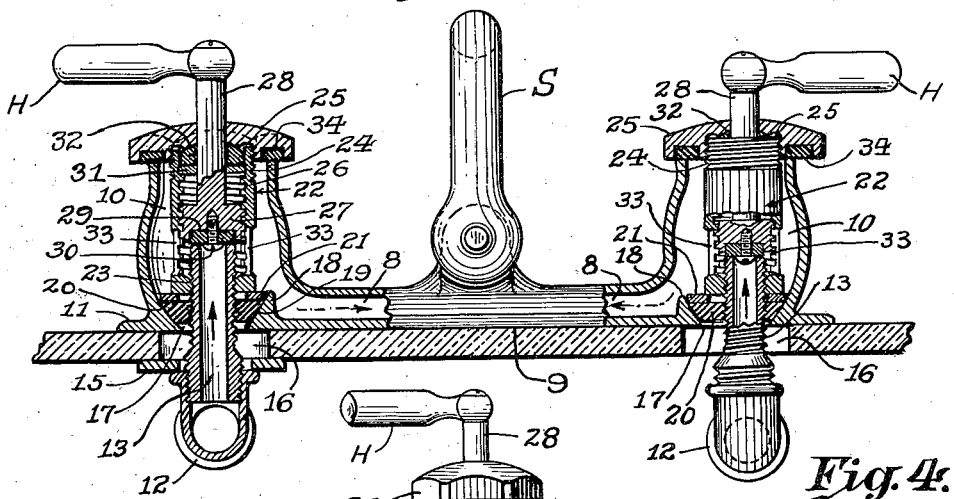
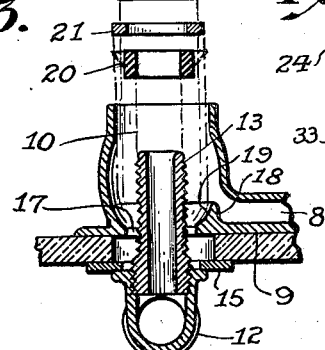
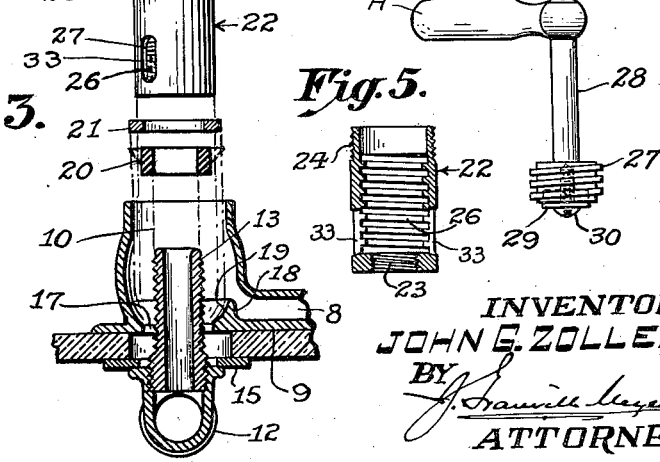
INVENTOR
JOHN G. ZOLLEIS
BY
ATTORNEY Aug. 20, 1935.   J. G. ZOLLEIS   2,012,091
VALVE
Filed May 24, 1933   2 Sheets-Sheet 2
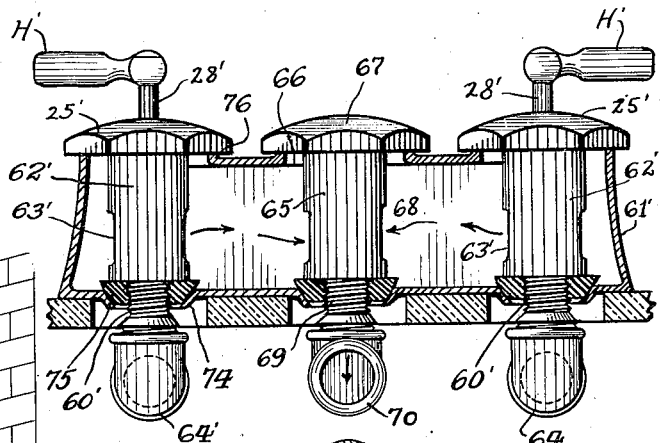
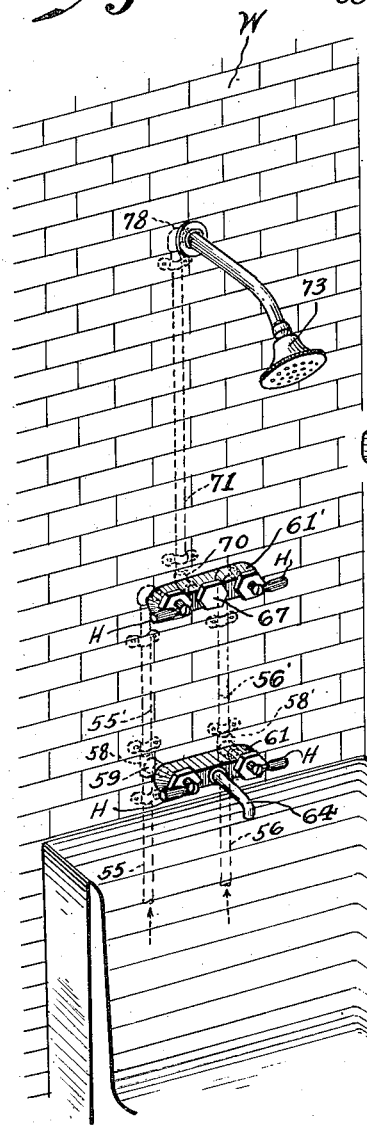
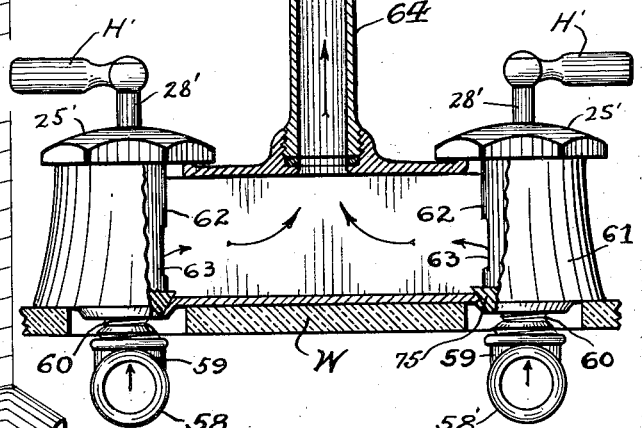
INVENTOR
JOHN G. ZOLLEIS
BY
J. Granville Meyers
ATTORNEY Patented Aug. 20, 1935

2,012,091

UNITED STATES PATENT OFFICE 2,012,091

VALVE

John G. Zolleis, Philadelphia, Pa.

Application May 24, 1933, Serial No. 672,696

8 Claims. (Cl. 277—57)

My invention relates to valves or faucets for use on sinks, bathtubs, wash basins, shower baths and the like.

Prior to my invention, valves or faucets for bathtubs, wash basins, sinks, shower baths and the like, were generally provided with a flange, union nut, and coupling to secure them in position on the tile wall, tub, or sink, and when installed, such valves extend a considerable distance out from the wall or surface of the sink, tub or basin. In the case of kitchen sinks this is very objectionable, because when dishes are being washed, they are frequently struck against the projecting spigot on the valve or faucet and break. Furthermore, the flange, coupling, and union nut, present an irregular surface and crevices making it not only difficult but practically impossible to completely clean valves or faucets of the type mentioned. Some valves or faucets are made with a single swiveled spigot attached to a unitary structure including two valves, one for hot water, and one for cold. Such combination fixtures are also generally secured to the sink, tub, or wall by two union nuts, couplings, and flanges, presenting the same objectionable features above pointed out, as well as requiring a considerable amount of material in manufacture, parts to be manipulated in installing the valve, and great area to be plated and polished.

It is a common complaint that combination faucets as made prior to my invention are difficult to install and are rarely installed accurately in respect to the sink or tub structure, that is, the couplings are rarely flush with the surface of the tub or sink or the combination fixture is rarely installed straight. This is due to the inability to adjust the two couplings with respect to the positions of the pipes at the rear of the splash-board, tub, or in the tile wall. In some cases, openings exist between the back of the flange and the face of the structure against which it should be flush. This is not only unsanitary and unsightly, but often times the flanges do not have sufficient adjustment to lock them tightly to the face of the splash-board, top, or wall.

In the case of concealed piping such as used for shower baths and where the pipes are within the wall and covered by tiling, it is often necessary when making repairs to tear out a substantial area of the tile or wall in order to mend or replace the faucets or valves. This is due to the fact that the pipes and couplings are firmly embedded in the wall.

With the foregoing in mind, an important object of my invention is to provide a valve or faucet eliminating the usual union nut, coupling or flange, and consequently reducing the cost by saving material and area to be plated, and at the same time, facilitating cleansing and polishing of the valve or faucet by eliminating the crevices and irregular surfaces inherent to the valves or faucets requiring union nuts, couplings, and flanges to secure them in place.

Another object of the invention is to provide a combination valve, faucet, or shower fixture embodying the foregoing desirable features and also affording, at the time of installation, adjustment with respect to the pipes to which it is to be coupled over a wide range, that is, vertically, laterally, in and out, as well as on a radius, so that regardless of the position of the pipes to which the valve is to be coupled the fixture constructed in accordance with my invention may be secured in a straight position and flush with the surface of the sink, tub, or wall.

Still another object of the invention is to provide in a valve or faucet of the above type, means for easily coupling the valve casing to the pipes, which are usually within the wall or behind the splash-board of the sink; and to have such means readily accessible at the front of the wall or splash-board and housed within the casing instead of being, as is usual, disposed behind the wall or splash-board and hence inaccessible.

Another object of the invention is to provide a relatively simple construction of valve seat affording adjustment of the valve proper in respect to the pipe to which the valve is to be coupled, and the wall, splash-board, or tub on which the valve is to be mounted as herinafter more particularly pointed out.

The foregoing and other objects and advantages of the invention will become apparent during the course of the following detailed description of the accompanying drawings, in which Fig. 1 is a perspective view of a combination valve embodying my invention installed;

Fig. 2 is a top plan view of the valve shown in Fig. 1 with parts broken away and in section;

Fig. 3 is an exploded view of the parts of the valve shown in section in Fig. 2;

Fig. 4 is a view in elevation of the valve handle and stem;

Fig. 5 is a vertical sectional view of the sleeve which receives the valve stem;

Fig. 6 is a view partly in elevation and partly in section of a single valve or faucet showing a modification of the invention;

Fig. 7 is a fragmentary perspective view of a tile wall and bath tub showing a preferred construction and arrangement of valves embodying my invention mounted on the wall and connected to pipes; and Figs. 8 and 9 are top plan views partly in section of the valves or fixtures shown in Fig. 7.

Figs. 1 and 2 of the drawings illustrate a combination valve or faucet embodying my invention installed on the splash-board of the sink. The splash-board is designated by the numeral 7 and the valve body proper or casing has two chambers, one for admission of hot water and one for admission of cold water at opposite ends and each controlled by a handle H. Intermediate the two chambers is a spigot S mounted in the conduit 8 which connects the two chambers 10 to convey either hot or cold water or a mixture thereof to the spigot. The spigot is preferably swiveled on the conduit, so that it may be swung from side to side. The rear face of the entire valve casing including conduit 8 is made to conform to the shape of the surface of the splash-board, tub, or wall against which the valve proper is to be mounted, and, in the instance shown, the rear face of the conduit designated by the numeral 9, in Fig. 2, is flat. The valve chambers 10 are preferably formed integral with the conduit 8 and have flanges 11 at their inner ends to also flushly engage against the surface of the splash-board.

The numerals 12 and 12' designate the couplings on the inlet pipes which are installed at the rear of the splash-board. The space between the splash-board and the wall is usually very limited, and access to the couplings on the pipes at the rear of the splash-board is difficult. In order to facilitate installation of the valve proper, I provide nipples 13 having enlarged ends 14 screw threaded to fit the couplings 12 and 12' as shown in Figs. 2 and 3. These nipples are inserted in the couplings prior to the application of the valve proper. Before inserting the nipples 13, washers 15 may be placed between the ends of the couplings and the splash-board, as is illustrated in connection with coupling 12, so that the end of the couplings will abut the washers. I wish it to be understood that the provision of the washer or washers between the coupling and the rear of the sink is not at all necessary, because it is quite common practice for plumbers to insert a block of wood or the like, between the inlet pipe and the rear of the sink to hold the pipe in desired position, and, of course, where the pipe is so braced it would not be necessary to have a washer.

After the nipples have been inserted in the couplings as shown in Fig. 3, the valve proper is placed up against the splash-board or wall with the nipples extending through relatively large openings 17 in the inner face of the valve chambers 10. The lower end of the walls of the chambers 10 are curved or tapered toward the openings 17, and where the passage through the conduit 8 communicates into the valve chambers, there is an upstanding flange 18 merging at its ends into the surface of the chambers 10, whereby a seat 19 is provided for a packing 20. This packing 20 may be of any suitable material, preferably a lead disc, which can be inserted over nipple 20 and forced down against the seat 19 as presently explained. A washer 21 is preferably placed on top of the packing 20. A sleeve designated generally by the numeral 22 and having internal screw threads 23 at its lower end to engage the threads on the nipple, forces the packing 20 and washer 21 down into the seat 19, drawing and holding the parts tightly together. This sleeve 22 has screw threads 24 at its other end to engage with screw threads on the cap 25. The usual quick turn squared threads 26 on the interior of the sleeve 22 mesh with threads 27 on the head of the valve stem 28, and a washer 29 is held to the head by screw 30. The upper end of the nipple 13 constitutes a valve seat for the washer 29.

The advantages of the construction and arrangement of parts thus far described are illustrated, so far as the connection of the faucet is concerned, in Fig. 2, wherein I have shown the coupling 12 centered with respect to the opening 17 at the left side of the faucet and coupling 12' out of alinement with the center or the opening 17 at the right side. Furthermore, the coupling 12 is nearer to the sink than is the coupling 12'. This illustrates an actual instance where a valve structure made in accordance with my invention was installed perfectly flush with the surface of the sink and in a straight position thereon, whereas other valve structures embodying the usual union nut, flange and coupling could not be so installed. My invention makes possible this straight and flush installation because the nipples are long enough to extend well into the chambers 10 and the sleeves 22 are attachable to the nipples regardless of the position of the nipple within the chambers 10, and, of course, the heads 27 on the valve stem are adjustable in the threaded portion 24 of the sleeves. Therefore, even though one of the pipe couplings be more remote from the rear surface of the sink than is the other, the casing is flushly installed on the splash-board. This is due to the fact that the sleeves and nipples are of such lengths that the threaded portion 23 of the sleeves 22 may be screwed down on the same portion of the nipples until they abut the washers 21 or the top surface of the packing 20, regardless of how much of the nipple extends through the packing. This explains how the adjustment is obtained vertically through the chambers 10, and the lateral adjustment of the valve with respect to the opening or openings in the sink structure and the position of the couplings 12 is hereinafter explained.

In assembling the valve stem and sleeve 22 to form the unitary structure as shown in Fig. 3, I screw the stem 28 into the sleeve with the threads 27 and 26 engaging. A washer 31 and packing 32 are then inserted in the upper end of the sleeve 22 and when the cap 25 is screwed tightly on to the threads 24, the valve stem, sleeve, and cap are held is assembled relation. Handle H is then attached to stem 28. It will be noted that sleeve 22 has ports or openings 33 at its lower end for flow of water, and when the washer 29 is tightly engaged against the upper end of the nipple 13, water cannot flow from the inlet pipes through the valve. In the form of the invention shown in Figs. 1-3, the cap 25 has an annular chamber 34 in alinement with the outer end of the valve chamber 10 and receiving a packing of any suitable character to form a tight seal between the cap and valve chamber.

I have previously explained the manner in which the nipples are attached to the couplings 12, and after both of the nipples have been attached, the valve proper or casing is placed against the splash-board or wall with the nipples 13 extending through the openings 17, and since these openings 17 are larger than the nipples, the valve casing may be shifted laterally, up and down, and on a radius to adjust it flushly against the splash-board or wall in proper position. The packings 20 and washers 21 are then inserted over the nipple, the sleeves 23 are screwed down on the nipples compressing the packing in the seats 19, and securing the casing to the splash-board or wall. The valve stems may then be inserted in the sleeves and screwed up until the washers 29 contact the ends of the nipples, after which the cap 25 is tightly screwed on to the outer ends of the sleeves 22 compressing the packing in the channel 34 against the ends of the valve chamber 10.

It should be obvious that the stem, cap, and sleeve may be assembled as a unit, as shown in Fig. 3, with the stem threaded into the sleeve and the cap threaded on to the sleeve. With the stem, cap, and sleeve thus assembled, it is only necessary, after properly positioning the nipples, to place the packing 20 and washer 21 over the nipple and then screw the sleeve down on to the end of the nipple, drawing the parts tightly together and compressing the packings.

I wish to call particular attention to the fact that the assembly and disassembly of the parts either upon installation or for repair is accomplished through the front, and it is not necessary for the plumber to manipulate any couplings or flanges at the back of the sink. This is especially useful in connection with concealed piping, such as used in showers where the pipes are within a tile wall, as access may be had to the valve structure and couplings, for the purpose of replacement or repair without breaking away any of the wall. I also wish to call attention to the fact that the construction of the valve casing and valve parts not only affords adjustment over a wide range at the time of installation and ready access at any time thereafter, but also affords a valve or faucet structure which does not project far out from the splash-board, and that the surface of the valve casing is substantially smooth throughout, so that it can be easily and thoroughly cleansed.

I have explained the method of making adjustment of the parts prior to tightening of the sleeve against the packing, but the wide range of adjustment possible under the construction and arrangement of parts disclosed should be more obvious by reference to Fig. 3, wherein the packing 20 is shown in full lines in the form of an annular washer-like body of deformable material and having straight walls. It will be noted that the thickness of the wall is less than the distance between the nipple and the top portion of the seat 19. Therefore, if the nipples 13 on the combination valve are coupled to the pipes within the wall, and the distance between the centers of the nipples is different than the distance between the centers of the chambers 10, that is, the centers of the openings 15, the valve casing may nevertheless be secured to the wall flushly and tightly, because the packings in the condition shown in full lines in Fig. 3 may be inserted on the nipples, the sleeves 22 threaded on to the nipples, and as the sleeves are tightened down against the packing, the same will be forced into the seats 19 to provide a tight joint, regardless of whether the nipples 13 are centered with respect to the openings 17 or not. By making the channels 34 containing the packing in the caps of greater width than the thickness of the ends of the chambers 10, the tight joint between the caps and casings may be effected regardless of whether the caps are accurately centered with respect to the centers of the chambers 10 or not. If, on the other hand, as under the old arrangement, where the couplings extend through the wall for connection with the union nut and flange, if the centers above mentioned do not coincide the valve casing cannot be flushly secured against the wall. In many instances, the pipes to which the couplings 12 are secured will yield slightly in certain directions but not in others, but under my invention it is immaterial whether the pipes will yield or whether they are rigid, because the sliding adjustment may be had in all directions. It will be noted that the washers 21 against which the sleeves abut are of sufficient width to permit engagement by the sleeves in all adjusted positions, and, of course, when the sleeves are tightened down against the washers 18 on the nipples 13, the packings 20 are forced into seats 19 and conformed to the shape of the seats.

In Fig. 6, I have shown a modification of the invention and have illustrated a single faucet composed of a casing 36 having a spigot 37 formed as a part thereof, and a bottom 38 provided with the opening 39 to receive a packing 40. The valve stem 41 has the head 42 threaded for engagement with the threads 43 in the neck of the casing 36, and the top of the casing is closed by a cap 44, between which in the top of the casing is interposed a packing 45. The head 42 carries the washer 46 to close the end of the nipple 13'. The nipple 13', in the form shown in Fig. 6, extends through an opening 47 in the top of a basin, and is screw threaded to receive a nut 48 beneath the basin if desired. The packing 39 is compressed by a nut 50 on the nipple. When the nut 50 is tightened it compresses the packing and tightly secures the valve casing in proper position.

It should be obvious that the nipple 13' may be the branch pipe leading from the supply pipe directly into the valve casing. Under structures generally in use prior to my invention there was considerable difficulty in making the connection between the supply pipe and the valve without straining the pipes or the joints, due chiefly to the irregularities of the installation of the supply pipes. In installing valves in accordance with my invention and particularly the structure of Fig. 6 the plumber may set the nut 48 on the pipe or nipple by hand and then make his connection to the supply pipe with the nut 48 set at a point on the nipple or pipe 13' which will bring it close to the under surface of the basin. He then inserts the packing 40 and nut 50, and as he tightens down on the nut 50 he draws the pipe or nipple 13' up until the nut 48 contacts the under surface of the basin. Thus, a tight seal or joint is obtained without straining the pipe. Furthermore, the features of adjustability hereinbefore pointed out are provided in the structure of Fig. 6, because the opening 39 is preferably larger than the nipple permitting lateral adjustment of the casing relative to the nipple, and the valve head 42 is adjustable in the upper end of the casing with respect to the various positions which the end of the pipe or nipple 13' may occupy after the installation is completed.

The construction and arrangement of parts of Fig. 6 affords the smooth casing, eliminates the union nut, flange, and coupling used prior to my invention, and also affords ready access to the valve head and nipple through the casing if repair or replacement is necessary.

In Figs. 7-9, I have illustrated another modification of the invention as applied to shower bath valves or fixtures. In Fig. 7, "W" indicates the tile wall and "T" the portion of a bath tub abutting the wall and behind which and the wall are the pipes 55 and 56. We will assume that the pipe 55 is the hot water pipe and the pipe 56 the cold water pipe, and each, of course, is embedded in the plaster or wall and covered and sealed by the tile.

In accordance with my invention, I provide couplings 58, 58', each in the nature of a T-coupling and the shanks 59 of which are connected to nipples 60 identical with the nipples 13. Adjacent the bath tub, a valve casing 61 is mounted over and connected to the nipples 60 in the same manner explained in connection with Figs. 1-5, that is, by means of sleeves 62 provided with ports 63 and otherwise identical with the sleeves 22, as shown in Fig. 9. The casing 61 has attached thereto a spigot 64 to discharge water into the bath tub when either of the handles H' are turned to move the head on the stem 28' away from the end of the nipple in the manner explained in connection with Fig. 2. The T-couplings are also connected to pipes 55', 56', alined with and communicating with the pipes 55 and 56, and the upper ends of the pipes 55', 56' are connected to elbow couplings 64, 64', which couplings in turn are connected to nipples 60' extending through openings in the wall the same as the nipple 60 and connected to sleeves 62', each having ports 63' the same as the sleeve 62. The sleeves 62' are disposed within a casing 61' substantially identical with the casing 61 except that instead of having a spigot 64 attached thereto, it has a sleeve 65 mounted through a front opening 66 and closed by cap 67 secured thereto, the same as the cap 25 is secured to the sleeve 22. The sleeve 65 is provided with ports 68 within the casing 61' and is atached to a nipple 69 identical with the nipples 60 and 60'. An elbow coupling 70 is attached to the nipple 69 and also to a pipe 71 which extends up to coupling 72 connected with shower head or nozzle 73.

It will be noted that both of the casings 61 and 61' have flat rear walls to flushly engage the tile wall "W" except for the flanges 74 which are disposed within the openings in the tile wall to receive and provide a seat for the packings 75 preferably of the same type and character, and inserted in the same manner as the packings 20 of Figs. 2 and 3. It will be noted that the caps through which the valve stems extend are the same as the caps 25 and preferably have the packing therein to abut the flanges 76 and the outer edges of the casings to form a tight seal when the parts are assembled as described in connection with Fig. 2. In fact the valves and casings shown in Figs. 8 and 9 embody all of the essential features of the casing shown in Fig. 2 and previously described including the smooth surface, elimination of union nut, flange and coupling, accessibility from the front for repair or replacement, and adjustability vertically with respect to the wall as well as laterally and radially.

The adaptation of the invention to valves or fixtures for shower baths, especially of the concealed pipe type as shown in Fig. 7, affords in addition to the foregoing, the following advantages. First, the valve casing 61' may be positioned at any point above the casing 61, so that if desired the valve handles may be conveniently located for grasping when one is standing in the tub without bending or stooping so as to come under the spray; secondly, the casings may be installed with facility and cheaply to replace antiquated fixtures; and third, the casings and handles do not extend far out from the wall. The installation and operation of the parts in and on the casing 61 is the same as described in connection with the structure of Fig. 2 and the same is true of the casing 61' with the exception of the additional sleeve connected to the nipples 69, which communicates with the pipe 71. In operation with the parts installed as shown and described, one may draw water for a tub bath by simply manipulating the handles H' on the casing 61. To take a shower, one would leave the handles H' on the casing 61 in position closing the nipples 60 and manipulate the handles on the casing 61', so that hot and cold water or either would flow through the pipes 55', 56', into the casing 61' through the port 63' and then through the ports 68 in the sleeve 65 through the nipples 69, coupling 70 and pipe 71 to the spray nozzle or shower head 73.

It is not essential to the practice of the invention in connection with shower bath valves or fixtures to have the casings of the identical configuration illustrated in Figs. 7-9, the essential feature being to have the respective casings adjustable not only vertically with respect to the walls and pipes as well as laterally and radially to obtain a straight and flush fit, but to also provide for installation of the casings at any desired points on the wall and connected to the pipes in the manner described affording accessibility from the front of the casing, whereby repair or replacement may be made without tearing out the tile wall as is necessary under the structures made and generally used prior to my invention.

I claim:

1. A combination valve or faucet comprising a casing having a pair of chambers at opposite ends and an intermediate portion connecting said chambers, a nozzle on said portion communicating therethrough with said chambers, the inner ends of said chambers and portion being formed to flushly engage against the surface of a supporting wall, enlarged openings through said inner ends of the chambers to register with openings in said wall, nipples of less diameter than the openings mountable through said openings for connection with pipes at the rear of said wall, said nipples extending into said chambers, caps to close the outer ends of said chambers, a sleeve connected to each of said caps, and to the ends of said nipples within the chambers to connect the casing to said wall, said casing being laterally shiftable during assembly relative to said nipples and pipes to facilitate positioning the casing on the supporting wall irrespective of the relative positions of the nipples.

2. A combination valve or faucet comprising a casing having a pair of chambers at opposite ends and an intermediate portion connecting said chambers, a nozzle on said portion communicating therethrough with said chambers, the inner ends of said chambers and portion being formed to flushly engage against the surface of a supporting wall, openings through said inner ends of the chambers to register with openings in said wall, nipples mountable through said openings for connection with pipes at the rear of said wall, said nipples extending into said chambers, caps to close the outer ends of said chambers, a sleeve connected to each of said caps, and to the ends of said nipples within the chambers to connect the casing to said wall, said nipples, pipes and sleeves being axially adjustable, and said casing being laterally adjustable relative to said nipples, pipes and caps.

3. A combination valve or faucet comprising a casing having a pair of chambers at opposite ends and an intermediate portion connecting said chambers, a nozzle on said portion communicating therethrough with said chambers, the inner ends of said chambers and the wall of said intermediate portion being formed to flushly engage against a surface of a supporting wall, openings of appreciable size through said inner ends of the chambers to register with openings in said wall, nipples mountable through said openings for connection to pipes at the rear of said wall, said nipples being of less diameter than said openings and extending into said chambers, caps to close the outer ends of said chambers, a sleeve connected to each of said caps and to the ends of the nipples within the chambers to connect the casing to said wall, said casing being laterally adjustable with respect to said caps, sleeves, and nipples.

4. A combination valve or faucet comprising a casing having a pair of chambers at opposite ends and an intermediate portion connecting said chambers, a nozzle on said portion communicating therethrough with said chambers, the inner ends of said chambers and the wall of said intermediate portion being formed to flushly engage against a surface of a supporting wall, openings of appreciable size through said inner ends of the chambers to register with openings in said wall, nipples mountable through said openings for connection to pipes at the rear of said wall, said nipples being of less diameter than said openings and extending into said chambers, caps to close the outer ends of said chambers, a sleeve connected to each of said caps and to the ends of the nipples within the chambers to connect the casing to said wall, said casing being laterally adjustable with respect to said caps, sleeves, and nipples, the ends of said nipples within said chambers constituting valve seats, a valve head mounted in said sleeve and movable with respect to the inner end of said nipple, and a washer carried by said valve head for contact with the end of said nipple.

5. A combination valve or faucet comprising a casing having a pair of chambers at opposite ends and an intermediate portion connecting said chambers, a nozzle on said portion communicating therethrough with said chambers, the inner ends of said chambers and the wall of said intermediate portion being formed to flushly engage against a surface of its supporting wall, openings of appreciable size through said inner ends of the chambers to register with openings in said wall, nipples mountable through said openings for connection of pipes at the rear of said wall, said nipples being of less diameter than said openings and extending into said chambers, caps to close the outer ends of said chambers, a sleeve connected to each of said caps and to the ends of the nipples within the chambers to connect the casing to said wall, said casing being laterally adjustable with respect to said caps, sleeves, and nipples, and a packing around each of said nipples compressible by said sleeve to form a tight seal between said nipples and the openings in the inner ends of the chamber.

6. A combination valve or faucet comprising a unitary casing having at opposite ends substantially tubular chambers connected by an intermediate portion provided with a conduit communicating with said chambers, said chambers and intermediate portion having a flat rear wall to flushly engage against a supporting wall or structure and the exposed exterior surface of said chambers and intermediate portion being substantially smooth throughout, means for connecting said casing to a supporting structure or wall with said flat portions flushly in engagement therewith, and said means being disposed entirely on the interior of the casing and accessible through the fronts of said chambers and comprising nipples mounted through openings in the rear ends of said chambers and connected to couplings at the rear of said structure or wall, a packing surrounding said nipple and arranged in a seat on the interior of said chambers, sleeves connected to said nipples within said chambers compressing said packing, and caps abutting the outer ends of said chambers and held thereagainst by said sleeves.

7. A combination valve of the character described comprising a casing having a surface to flushly engage the face of a supporting structure and an opening adjacent each end of the casing through said surface, a nipple mountable through each of said openings and the supporting structure for connection with supply pipes at the rear of said structure, said nipples each having a screw threaded shank disposed within the casing, a sleeve for connection with each of said nipples within the casing and mountable through openings in the surface of said casing opposite said first surface, said first openings being of greater diameter than the nipples to afford lateral and radial movements of the casing relative to the nipples and sleeves if the supply pipes to which the nipples and sleeves are connected are not alined with the centers of the openings, and said sleeves and the shanks of said nipples being of sufficient lengths to permit connection therebetween within the casing regardless of the thickness of the supporting structure through which the nipples extend or the distance of the supply pipe from said surface, and a packing around each nipple and clamped between the ends of the sleeves and said casing on the interior thereof, said parts when connected holding the casing to the supporting structure.

8. A combination valve of the character described comprising a casing having a surface to flushly engage the face of a supporting structure and an opening adjacent each end of the casing through said surface, a nipple mountable through each of said openings and a supporting structure for connection with supply pipes at the rear of said structure, said nipples each having a screw threaded shank disposed within the casing, a sleeve for connection with each of said nipples within the casing and mountable through openings in the surface of said casing opposite said first surface, said first openings being of greater diameter than the nipples to afford lateral and radial movements of the casing relative to the nipples and sleeves if the supply pipes to which the nipples and sleeves are connected are not alined with the centers of the openings, and said sleeves and the shanks of said nipples being of sufficient lengths to permit connection therebetween within the casing regardless of the thickness of the supporting structure through which the nipples extend or the distance of the supply pipe from said surface, and a packing around each nipple and clamped between the ends of the sleeves and said casing on the interior thereof, said parts when connected holding the casing to the supporting structure, and a valve head adjustably mounted in each sleeve to close the ends of said nipples.

JOHN G. ZOLLEIS.